United States Patent
Matousek et al.

(10) Patent No.: US 10,244,685 B2
(45) Date of Patent: Apr. 2, 2019

(54) STRAW CHOPPERS FOR AN ARTICULATED HARVESTING COMBINE

(71) Applicant: Tribine Industries LLC, Logansport, IN (US)

(72) Inventors: Robert A. Matousek, Valley Center, KS (US); Bryan S. Claerhout, Hesston, KS (US); Dillon M. Thompson, Newton, KS (US)

(73) Assignee: Tribine Industries LLC, Logansport, IN (US)

( * ) Notice: Subject to any disclaimer, the term of this patent is extended or adjusted under 35 U.S.C. 154(b) by 73 days.

(21) Appl. No.: 15/652,806

(22) Filed: Jul. 18, 2017

(65) Prior Publication Data
US 2018/0049372 A1   Feb. 22, 2018

Related U.S. Application Data

(60) Provisional application No. 62/375,468, filed on Aug. 16, 2016.

(51) Int. Cl.
| | | |
|---|---|---|
| *A01F 29/06* | (2006.01) | |
| *A01F 29/12* | (2006.01) | |
| *A01F 12/40* | (2006.01) | |
| *A01D 41/12* | (2006.01) | |

(52) U.S. Cl.
CPC .......... *A01F 29/06* (2013.01); *A01D 41/1243* (2013.01); *A01F 12/40* (2013.01); *A01F 29/12* (2013.01)

(58) Field of Classification Search
CPC .......... A01F 29/06; A01F 29/12; A01F 12/40; A01D 41/12
See application file for complete search history.

(56) References Cited

U.S. PATENT DOCUMENTS

| | | | | |
|---|---|---|---|---|
| 5,556,042 A | * | 9/1996 | Roberg | A01D 41/1243 241/101.76 |
| 6,736,721 B2 | * | 5/2004 | Niermann | A01D 41/1243 460/112 |

(Continued)

FOREIGN PATENT DOCUMENTS

EP        1897430 A1 *   3/2008   ......... A01D 41/1243

*Primary Examiner* — Arpad Fabian-Kovacs
(74) *Attorney, Agent, or Firm* — Mueller Law, LLC; Jerry K. Mueller, Jr.

(57) ABSTRACT

Straw chopper assemblies are provided for a harvesting combine of the type having a rotor and cage threshing assembly. The straw chopper assemblies are located on each side of the rotor discharge for accepting material exiting the rotor. Each straw chopper assembly is formed from a curvilinear cage having and interior opening to accept the rotor discharged material, and an opening to distribute chopper straw outside of the harvesting combine. A rotating knife assembly is housed within each curvilinear cage. A stationary knife assembly is movable for the rotating knives to pass between adjacent pairs of stationary knives. Outlets are provided in material communication with the curvilinear cage openings for discharging chopped straw onto the ground adjacent to the harvesting combine. Hoods are located over each of the outlets to directing the discharged chopped straw onto the ground.

6 Claims, 12 Drawing Sheets

(56) References Cited

U.S. PATENT DOCUMENTS

| | | | |
|---|---|---|---|
| 2003/0109294 A1* | 6/2003 | Wolters | A01F 12/40 460/112 |
| 2004/0014511 A1* | 1/2004 | Johnson | A01F 12/40 460/112 |
| 2004/0053652 A1* | 3/2004 | Duquesne | A01D 41/1243 460/112 |
| 2011/0093169 A1* | 4/2011 | Schroeder | A01D 41/1243 701/50 |
| 2013/0095899 A1* | 4/2013 | Knapp | A01D 41/1243 460/111 |
| 2013/0263565 A1* | 10/2013 | Yde | A01D 41/1243 56/122 |
| 2014/0179383 A1* | 6/2014 | Isaac | A01F 12/40 460/112 |
| 2014/0326815 A1* | 11/2014 | Dilts | A01F 12/40 241/54 |
| 2014/0364179 A1* | 12/2014 | Brinkmann | A01D 41/1243 460/112 |
| 2016/0007537 A1* | 1/2016 | Dilts | A01F 12/40 460/112 |
| 2016/0150728 A1* | 6/2016 | Duquesne | A01F 12/18 460/112 |
| 2017/0099771 A1* | 4/2017 | Linde | A01F 12/40 |
| 2018/0070534 A1* | 3/2018 | Mayerle | A01F 12/40 |
| 2018/0177127 A1* | 6/2018 | Holmen | A01D 41/1243 |

* cited by examiner

STRAW CHOPPERS FOR AN ARTICULATED HARVESTING COMBINE

CROSS-REFERENCE TO RELATED APPLICATIONS

This application claims benefit of provisional application 62/375,468 filed Aug. 16, 2016; and is cross-referenced to application Ser. No. 14/946,827 filed Nov. 20, 2015; Ser. No. 14/946,842 filed Nov. 20, 2015; Ser. No. 14/967,691 filed Dec. 14, 2015; Ser. No. 15/621,218 filed Jun. 13, 2017; Ser. No. 15/643,685 filed Jul. 7, 2017; and Ser. No. 15/642,799 filed Jul. 6, 2017; and Ser. No. 15/649,684, filed Jul. 14, 2017.

STATEMENT REGARDING FEDERALLY SPONSORED RESEARCH

Not applicable.

BACKGROUND

The present disclosure relates to harvesting articulated (jointed) combines and more particularly to straw chopper assemblies that provide uniform distribution of chopped MOG or straw.

Over decades of development of grain harvesting combines, an area of performance for the machine that has often not kept up with the expectations of the customers, is the handling of the residue that exits the rear of the machine after the grain has been (mostly) removed. It typically is desired that the material be chopped into smaller pieces and distributed across the swath cut by the header on the front of the machine. If done properly, this greatly facilitates ensuing tillage and/or seeding operations.

In the last two decades, there are many compounding factors that have led to significantly higher expectations of the performance of the residue handling systems to meet chopping and spreading performance criteria, such as width of spread versus header width; uniformity of spread across the width of the header swath; and quality of chop defined by the "fineness" or length and uniformity of the chop. A list of the confounding situations that require attention to detail include the following:

1. Effective "no till" farming practices now require that the chopped residue be quite uniformly distributed onto the land nearly in the uniformity that existed before cutting.
   a. "Swaths" of heavy and light concentration severely hamper no till operations and subsequent yield expectations, herbicide efficacy, and soil moisture conditions.
2. With more powerful harvesters and ever increasing widths of the grain header that collects the crop and gathers it into the harvester, the residue spreading system also is required to extend to greater distances away from the side of the harvester, which is difficult considering the light, fluffy nature of the material being spread.
3. Soil and water conversation practices and expectations are increasingly requiring that the residue uniformly cover the surface of the soil to prevent both rain and wind erosion.
4. High production cropping has taught farmers that yield expectations from soil thickly covered with residue or thinly covered with residue are vastly different, it being unacceptable to have repetitive strips in the field showing these differences, which leads to reduced profit potential.
5. Achieving economic gain by reducing soil compaction translates into reduction of tillage, which was historically used to deal with the residue.
6. Ever-increasing crop grain yields have for the most part increased proportionally to the amount of residue that has to be dealt with by the harvester and ensuing machines.
7. Modern crops have been naturally or genetically modified to remain alive and "green" while the grain is dry enough to harvest, causing the harvester and its residue systems to have to deal with ever tougher, harder, and increased quantities of cut vegetative matter.

With this understanding, we can appreciate that traditional methods will not satisfy current demands, even with residue management (straw choppers and straw/chaff spreaders) tools for combines that have been evolving in recent decades. It was typical to place spinning straw spreader disks at the rear of the combine and dump the residue on these disks to be spun out onto the ground, as best as it could be. The material could be as-delivered from the thresher or it could be material that passed through an internal straw chopper present in certain current models of combines (e.g., Case IH, CNH Industrial America LLC, rotary combines) and, thus, cut to a shorter length before the spreaders flung the material outwardly onto the ground. In both cases, the energy imparted to the material was not sufficient to allow the material to be flung a sufficient distance to cover a swath from a wide header.

Another traditional method of residue spreading was to mount a transverse chopper mechanism at the rear of the separator hood, and deliver whole residue to the inlet of the chopper housing for chopping by rotating flail knives, which in turn imparted significant energy to the material due to the high speed of rotation. This velocity energy, then, is used to fling the material rearwardly into a "tail board" configuration that had straight and/or curved blades that were used to deflect the material flow increasingly outwardly to try to effect a wide spread. For the material that was to fall directly behind or somewhat outside of the width of the combine separator, this was very effective. However, the material that had to be deflected a considerable distance by a deflector fin that set at some significant angle to the rearward direction of velocity, the act to hitting and reflecting off the fin tended to consume a lot of the energy, thereby killing the ability for it to be thrown a good distance to the side of the machine.

To answer this deficiency, Redecop in U.S. Pat. No. 5,482,508 teaches that the chopper blades can be altered so as to cause them to generate significant air velocity that can aid in carrying the chopped material against and around the curve of the longer bent fins that deflect material to the side of the machine. This method was largely effective at widening the spread swath to header widths common to the 1990's, typically less than 40 feet in width. But a huge negative to this technique was a near doubling of the horsepower required to drive the chopper, which severely degraded the performance of the combine. And, as headers surpassed the typical 30 to 35 foot width of the 1990's up to 40 to 50 feet in the 2010's, this method proved impractical due to power consumption, if not inadequate in spread width.

Subsequently, in U.S. Pat. No. 6,547,169 Matousek teaches that if spinning disks are oriented in a (near) vertical orientation at the rear of the separator and are further configured to accept material from the rotor discharge, the spinning disks are capable of throwing the material to the side of the machine with significant velocity and, thus, reach greater distances. The founding principal of this work was that one should throw without deflecting the material toward the furthest distance desired, letting deflected material fill the distances that are less far away from the machine.

Again in U.S. Pat. No. 6,616,528, Wolters and Matousek teach that the same principal can be applied to side-by-side vertically oriented chopper disks also located at the rear of the separation chamber. And still others have chosen to place the spinning horizontal straw spreader directly behind the straw chopper hood, directly in the flow of chopped material exiting the transverse straw chopper with the hope that the spinning spreaders could change the direction of the rearward flow and fling it outwardly from the side of the machine. This system has met with mixed results, and is mostly incapable of the wide spread required.

The present disclosure is an improved straw chopper and spreader system that spreads the chopped material to the header width distances required by modern farming systems.

BRIEF SUMMARY

Disclosed are straw chopper assemblies for a harvesting combine of the type having a rotor and cage threshing assembly. The straw chopper assemblies are located on each side of the rotor discharge for accepting material exiting the rotor. Each straw chopper assembly is formed from a curvilinear cage having and interior opening to accept the rotor discharged material, and an opening to distribute chopped straw outside of the harvesting combine. A rotating knife assembly is housed within each curvilinear cage. A stationary knife assembly is movable for the rotating knives to pass between adjacent pairs of stationary knives. Outlets are provided in material communication with the curvilinear cage openings for discharging chopped straw onto the ground adjacent to the harvesting combine. Hoods are located over each of the outlets to directing the discharged chopped straw onto the ground.

BRIEF DESCRIPTION OF THE DRAWINGS

For a fuller understanding of the nature and advantages of the present method and process, reference should be had to the following detailed description taken in connection with the accompanying drawings, in which.

The drawings will be described in greater detail below.

DETAILED DESCRIPTION

The architecture of the disclosed harvesting combine precludes the exiting of the long residue material (straw, stalks, etc.) out the rear of the whole combine due to its articulated configuration, inasmuch as the separator and, thus, straw discharge are located in the middle of the machine and directly in front of the wide rear module grain tank. Due to this configuration, and with the understanding that the high-energy material exiting a rotating straw chopper should be directed without interference outwardly from the side of the separator, a viable, if not ideal alternative exists. Pull the straw off the side of the rotor near the rear and transfer it into choppers that can chop the straw into suitably small pieces for throwing directly outwardly from the sides of the machine.

Secondly, in this architecture, space in the length of the machine is very precious, so it is advantageous for the choppers to not be traditionally located behind the rear of the rotor, which would undesirably add to the length of the overall machine. Instead and ideally, the straw choppers are located beside the rear portion of the rotor and occupy the same longitudinal space as the rear (discharge) portion of the rotor. This configuration would not add to the overall length of the machine. With these chopper rotors located directly to the side of the main rotor, they can accept material that is being discharged by centrifugal force from the spinning of the material around the rotor. In this discharge section at the rear of the rotor, specially designed protrusions are suited for accelerating the material flow to speeds very near the peripheral speed of the rotor. Thus, material is want to exit outward from the spinning rotor and into the inlet portions of the spinning choppers located near horizontal center line and directly on each side of the rotor.

Figure 1:
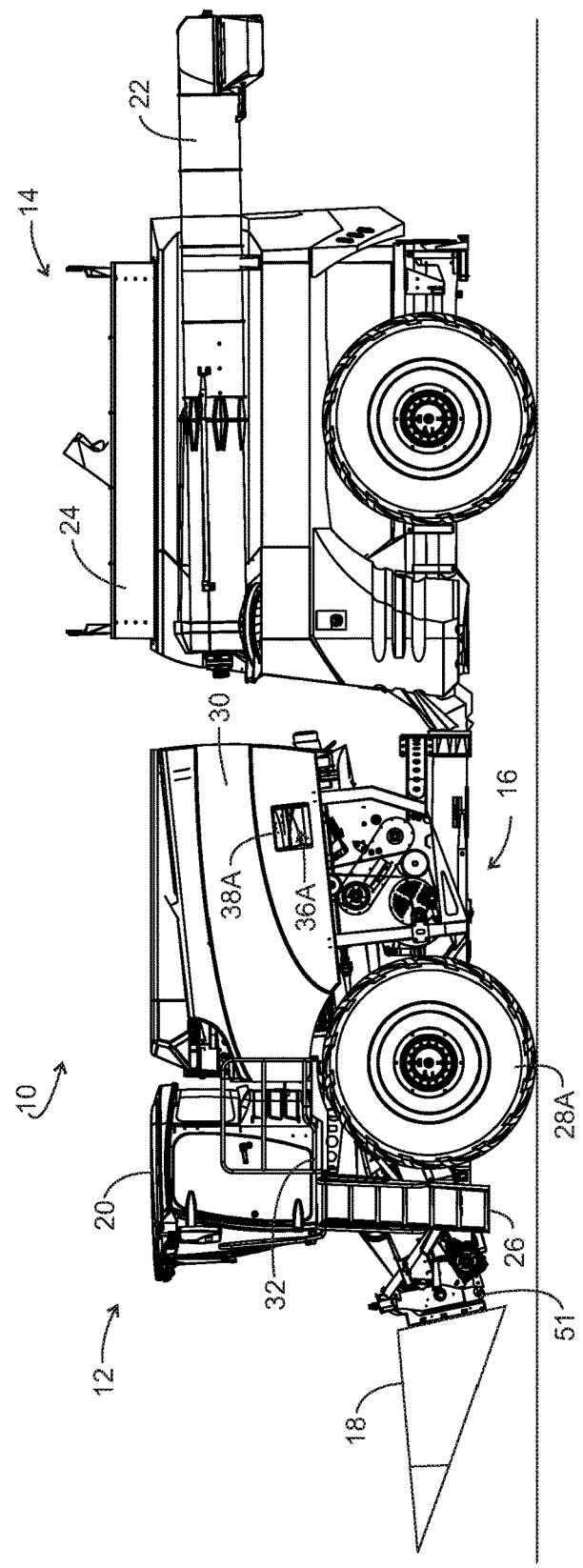
FIG. 1 is a side view of the articulated harvesting combine fitted with the disclosed straw chopper and distribution assembly disclosed herein.
Figure 2:
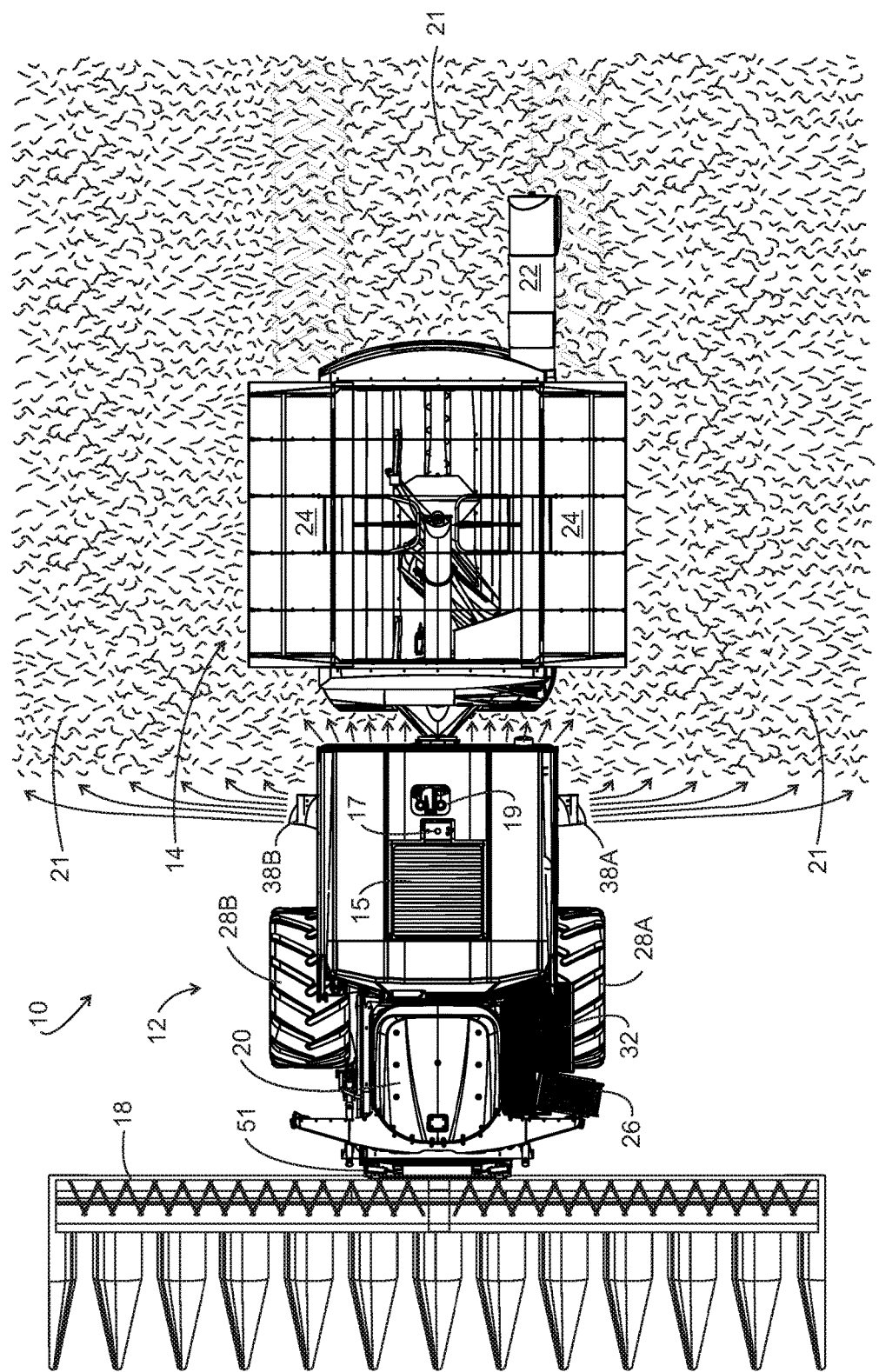
FIG. 2 is a top view of the articulated harvesting combine of FIG. 1 showing the pattern of distributed chopped straw therefrom.
Figure 3:
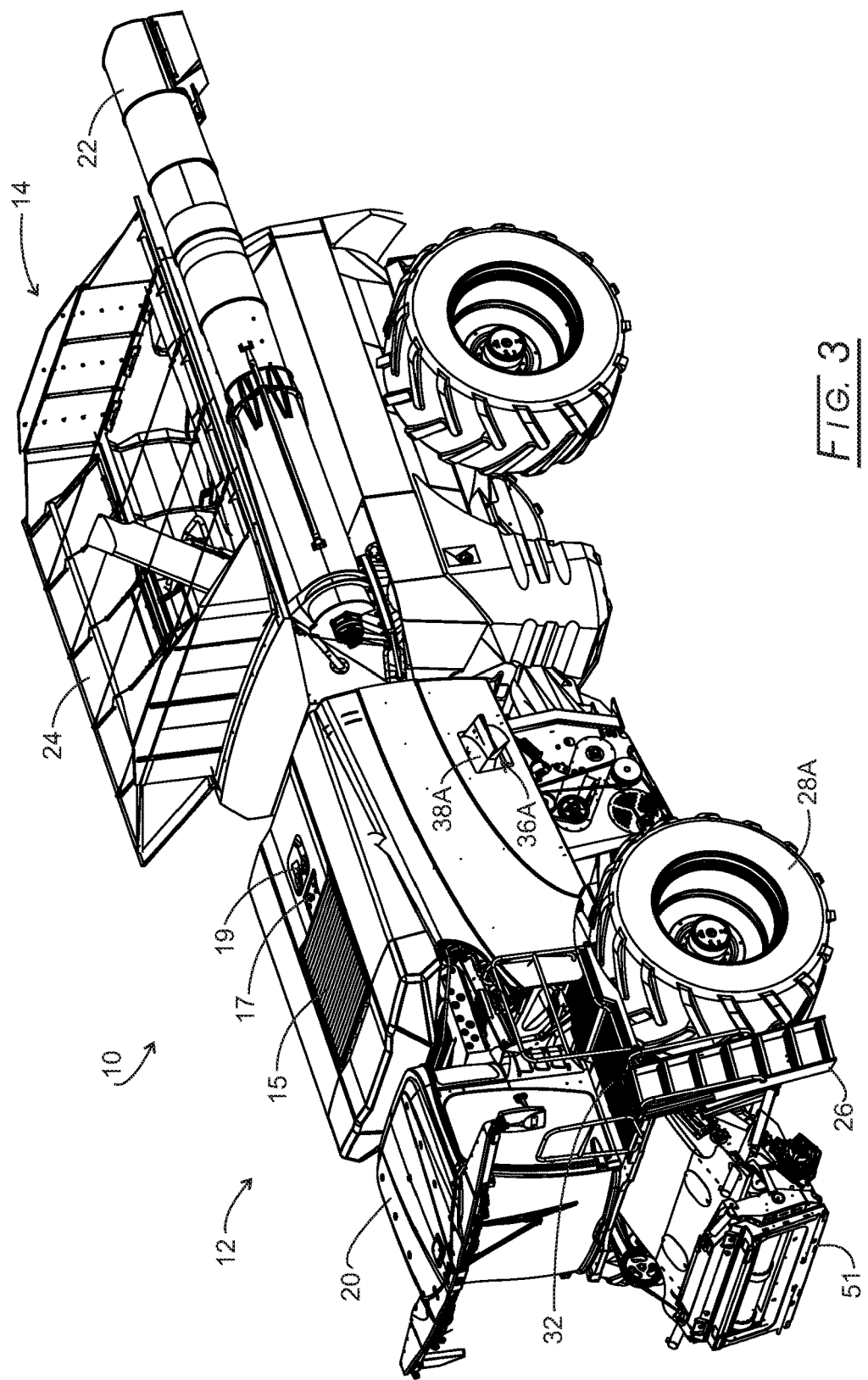
FIG. 3 is an isometric view of the left side of the articulated harvesting combine of FIG. 1.

Referring now to the drawings and specifically referring initially to FIGS. 1, 2, and 3, an articulated harvester, 10, consists of a powered PPU, 12, a rear grain cart, 14, and an articulation joint, 16, that connects PPU 12 with rear grain cart 14. The details of articulation joint 16 are disclosed in commonly owned application Ser. No. 14/946,827 filed Nov. 20, 2015. PPU 12 carries a grainhead, 18, supported by a feeder house, 51, operator's cab, 20, grain cleaning and handling assembly, and engines. PPU 12 is devoid of any grain storage, such being exclusive in rear grain cart 14. While both PPU 12 and rear grain cart 14 are shown being carried by wheel assemblies, one or both could be tracked. A screened air inlet, 15, is located atop PPU 12 where the air likely is the cleanest around harvesting combine 10. A radiator cap, 17, and engine exhaust, 19, are located behind screened air inlet 15. The arrows in FIG. 2 show the distribution of chopped straw, 21, created by the disclosed straw chopper assemblies. It will be observed that the distribution is at least as wide as grainhead 18, as desired, and the distribution is relatively even across the entire wide of chopped straw 21.

An off-loading auger assembly, 22, is in the folded home position and being carried by rear grain cart 14. Grain cart 14 also bears a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. A grain storage bin is carried by grain cart 14 may be made of plastic also in keeping with desirable weight reduction; although, it could be made of metal also at the expense of weight. All plastic parts may be filled with particulate or fiber reinforcement in conventional fashion and could be laminate in construction. Further details on rear grain cart 14 can be found commonly owned application Ser. No. 14/946,842 filed Nov. 20, 2015.

Figure 4:
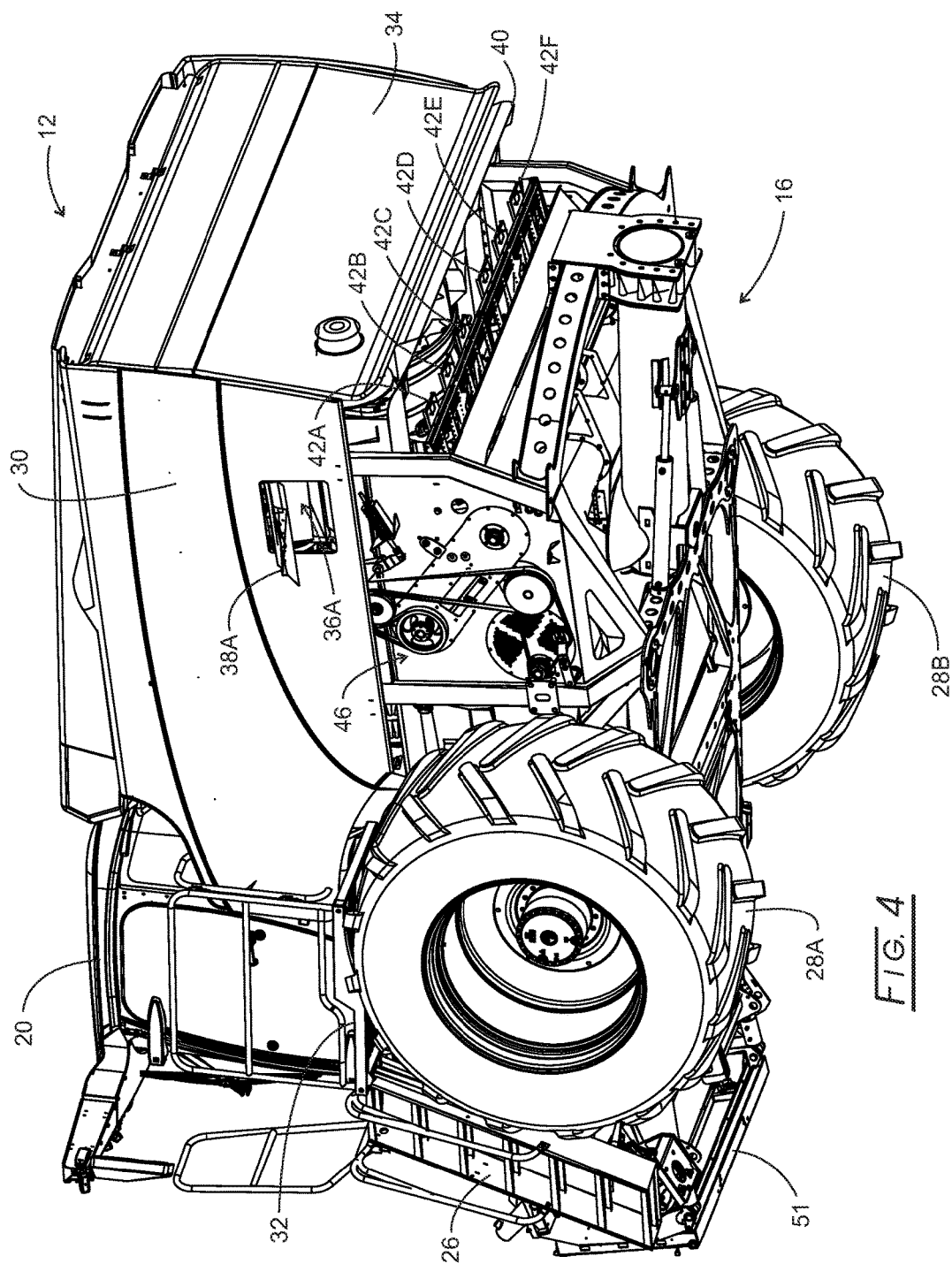
FIG. 4 is a bottom isometric view of the left rear end of the forward unit of the articulated harvesting combine of FIG. 1 showing the exit opening for the chopped straw.

Referring now also to FIG. 4, the operator is granted access to cab 20 by a stair assembly, 26, that extends upwardly from just above the ground and will be more fully disclosed in commonly owned application Ser. No. 15/654,786, filed Jul. 20, 2017, now abandoned (62/375,986 filed Aug. 17, 2016). PPU 12 is supported by wheel assemblies, 28A and 28B (FIG. 2). Movable side panels, 30 and 31 (see FIG. 5), grants access to the operator or mechanic to the internal mechanisms housed with in PPU 12 from stair assembly 26 and a platform, 32, and retains a foldable platform movable from a vertical home position while the panels are in place to a horizontal active position when the panels are moved away. Such foldable platform mates with platform 32. The movable side panel is more particularly disclosed in commonly owned application Ser. No. 15/662,332, filed Jul. 28, 2017 (62/376,512 filed Aug. 18, 2016).

Figure 5:
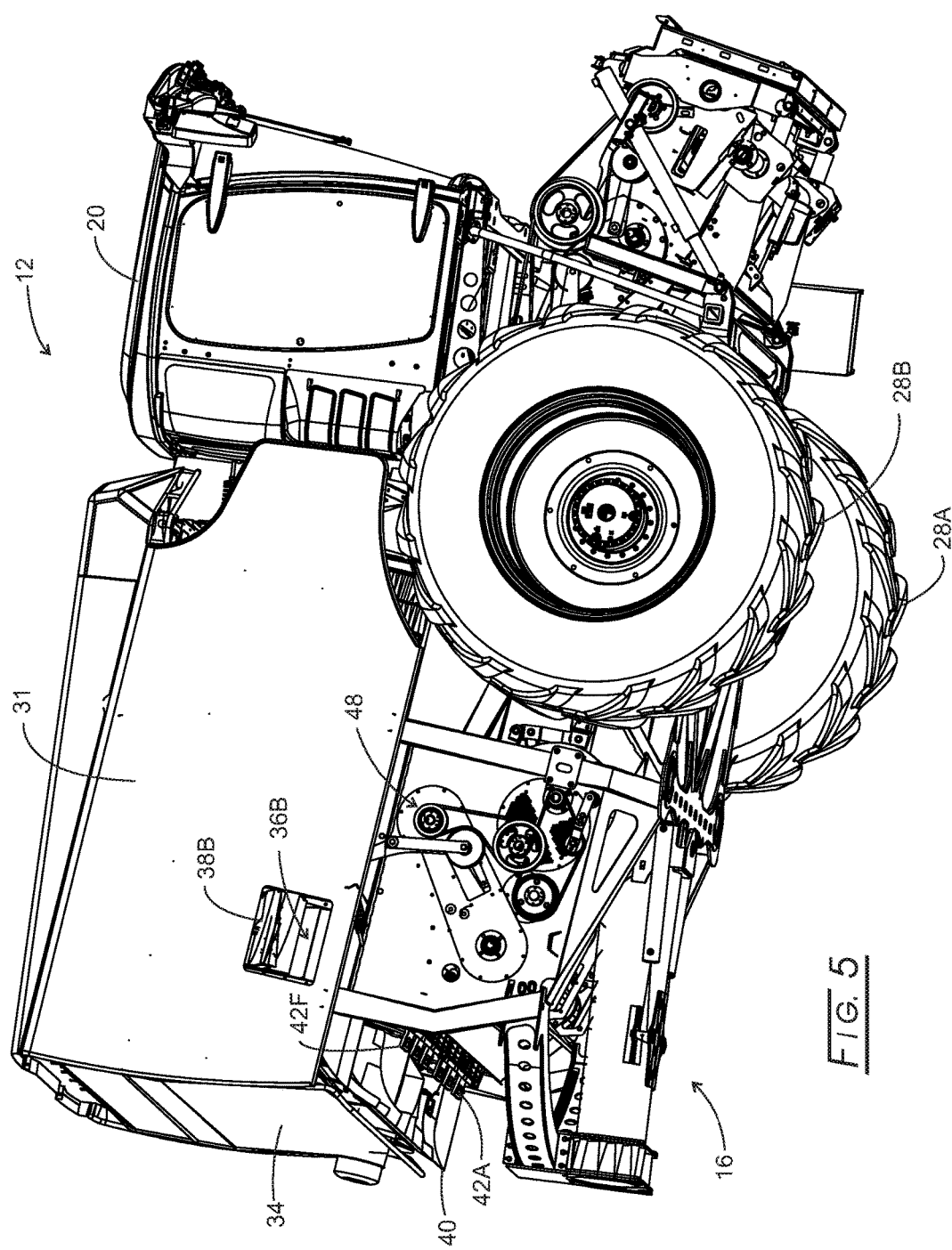
FIG. 5 is a bottom isometric view of the right rear end of the forward unit of the articulated harvesting combine of FIG. 1 showing the exit opening for the chopped straw.
Figure 6:
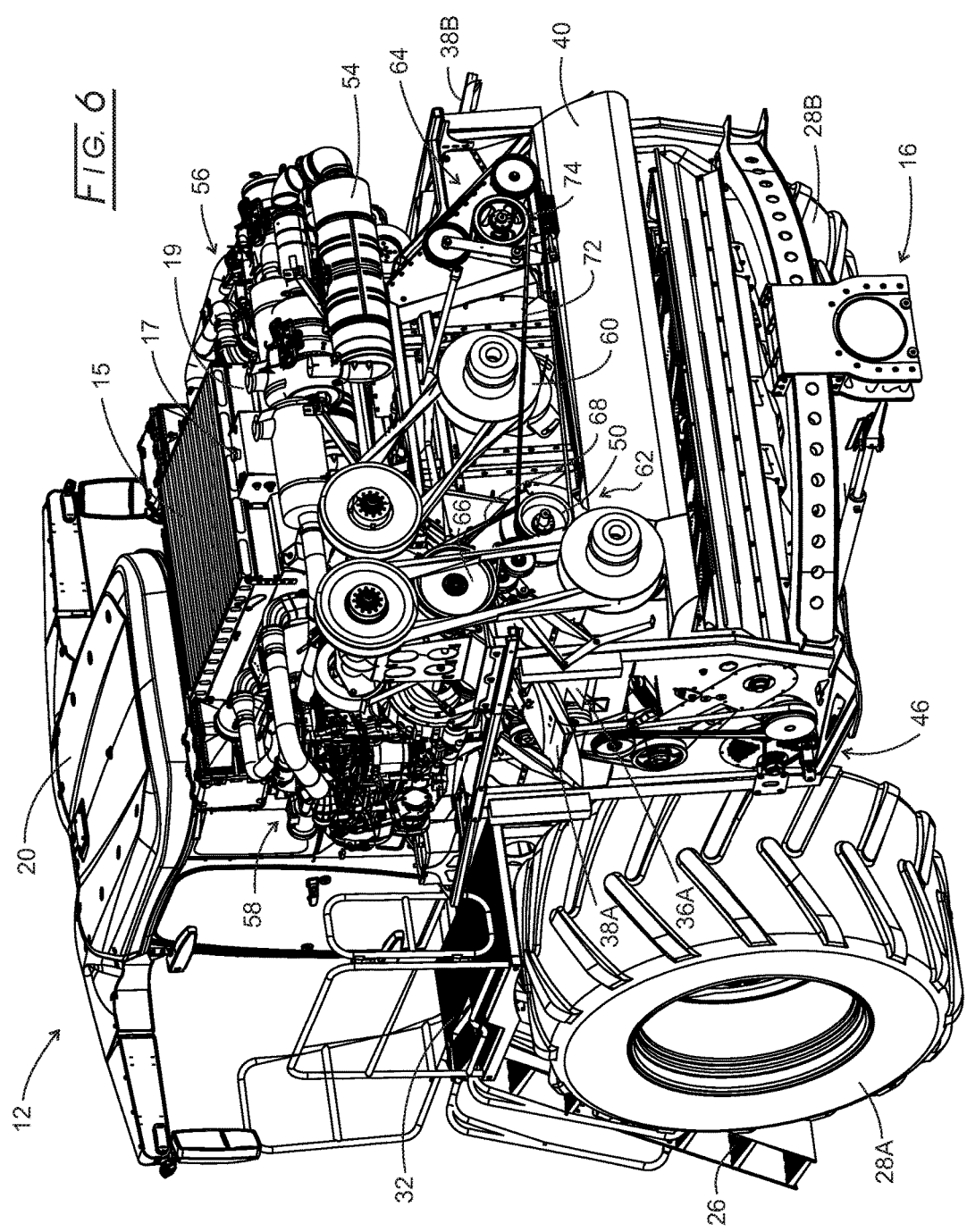
FIG. 6 is an isometric view of the left rear side of the forward unit of the articulated harvesting combine of FIG. 1 with the outer coverings or skins removed.
Figure 7:
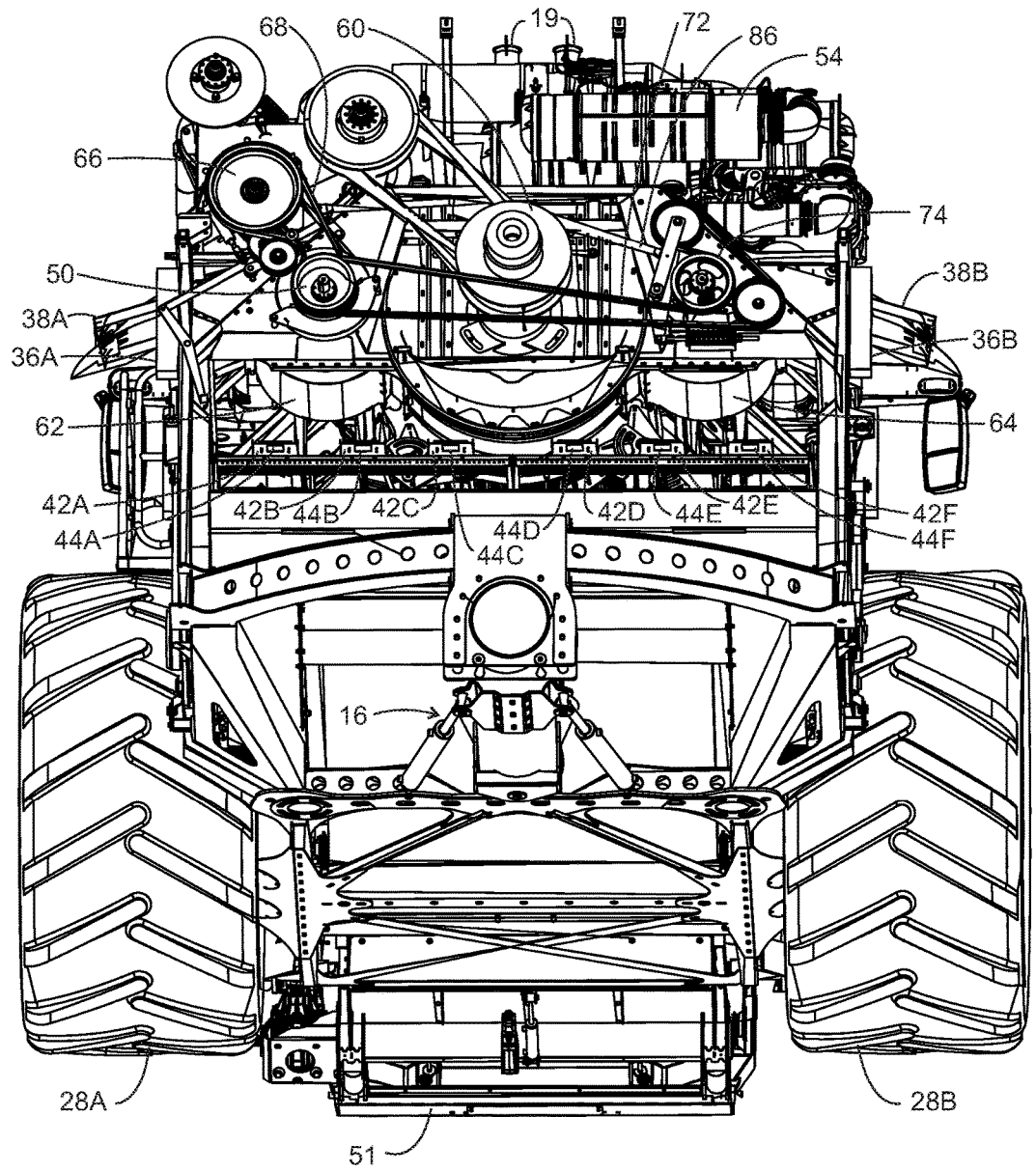
FIG. 7 is an isometric view of the rear side of the forward unit of the articulated harvesting combine of FIG. 1 with additional internal components removed to better see the disclosed straw chopper and distribution assemblies disclosed herein.

In FIGS. 4 and 5, a rear panel, 34, covers the back of PPU 12. Panels 30, 31 (see FIG. 5), and 34 only extend downwardly to cover about one-half of the height of PPU 12, allowing access to the exposed internal components for repairs, maintenance, and like occasions. Towards the rear of both panels 30 and 31 are MOG (or for present purposes, chopped straw) outlets, 36A and 36B, respectively, having top deflector plates, 38A and 38B, respectively. These deflector plates are adjustable for determining the location for depositing MOG expelled from the straw chopper assemblies, as will be further detailed below. MOG discharged from the rear of PPU 12 strikes a deflector, 40 (see FIG. 5), to direct the MOG downwardly and not at grain cart 14. Six extensions, 42A-42F, terminated by sensors, 44A-44F (see also FIG. 7), respectively, are located just before hood 40 and provide additional data to the operator.

Various drive, sprocket, wheel, and belt assemblies, 46 (FIG. 4) and 48 (FIG. 5), power and operate the bonus sieves assemblies disclosed in U.S. Ser. No. 15/649,684, filed Jul. 14, 2017 and will, accordingly, not be described herein. Suffice it to say that the MOG flow from the rotor (concaves and grates) is passed to the bonus sieves that are located in the rear outer space of PPU 12, which space is open due to the lack of rear wheel assemblies. Such bonus sieves assemblies permit all MOG recycle to be passed back to the bonus sieves assemblies and not to the concaves or grates. An additional airflow is provided for the bonus sieves assemblies, which also could be used in the disclosed straw chopper assemblies.

Exhaust after treatment assembly, 54, cleans air for emission control. An engine 56, powers the hydraulics for articulated combine 10, while an engine, 58, powers all other components of articulated combine 10. The rotation of the rotor assembly (not seen) occurs by virtue of a pulley assembly, 60, a gearbox (not seen), and shaft (not seen). Power to straw chopper assemblies, 62 and 64, is provided by through a pulley assembly, 66, that is connected by a belt, 68, to a pulley assembly, 50, for straw chopper assembly 62, which in turn is connected by a belt, 72, to a pulley assembly, 74, for straw chopper assembly 64.

Figure 8:
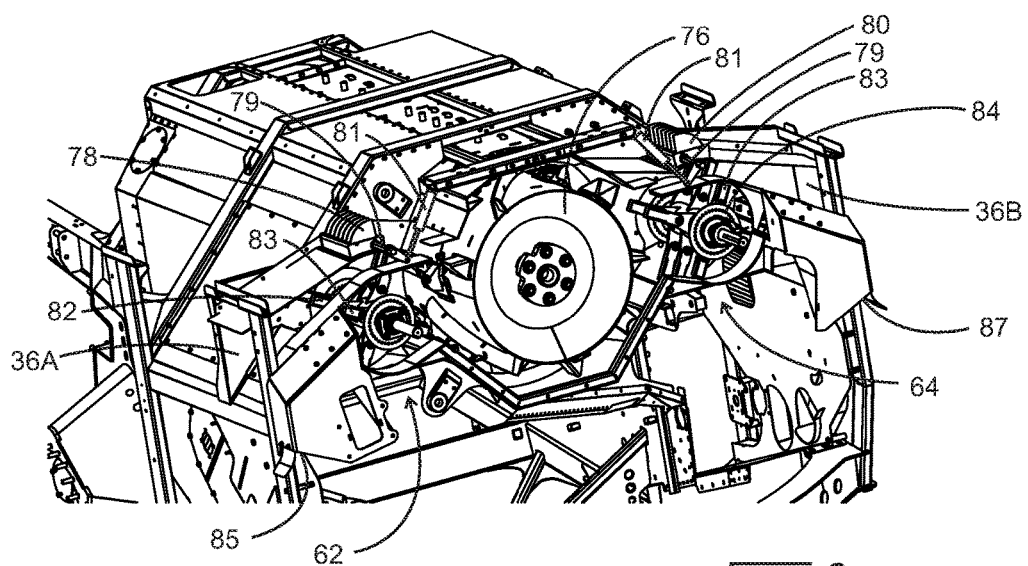
FIG. 8 is an isometric view of the disclosed straw chopper assemblies with much of the intervening structure being removed.
Figure 9:
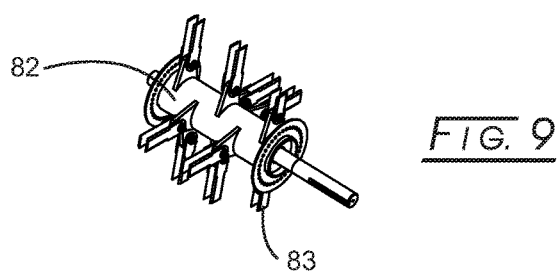
FIG. 9 is an isometric view of one of the rotating blade assemblies.
Figure 10:
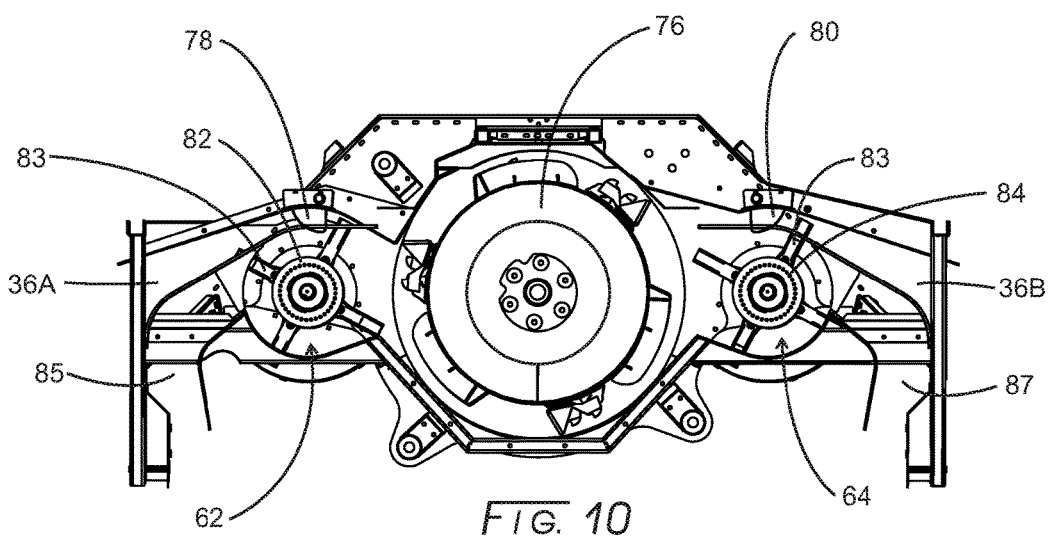
FIG. 10 is a rear view of the straw chopper assemblies.

Referring to FIGS. 8-10, material enters the rear section of a rotor assembly, 76, such that it travels over the top of the axial rotor and is discharged into right side chopper assembly 64, while material entering in the lower part of the rotor will enter left side chopper assembly 62. In both cases the material exiting axial rotor 76 at velocity will enter the face of each chopper assembly and be forced to pass over the top, with or without being ripped through stationary knife assemblies, 78 and 80, in the upper sheet of the chopper cavity. The shown embodiment chooses to the material to traverse over the top, bottom, or both directions would be acceptable for the material flow.

Figure 11:
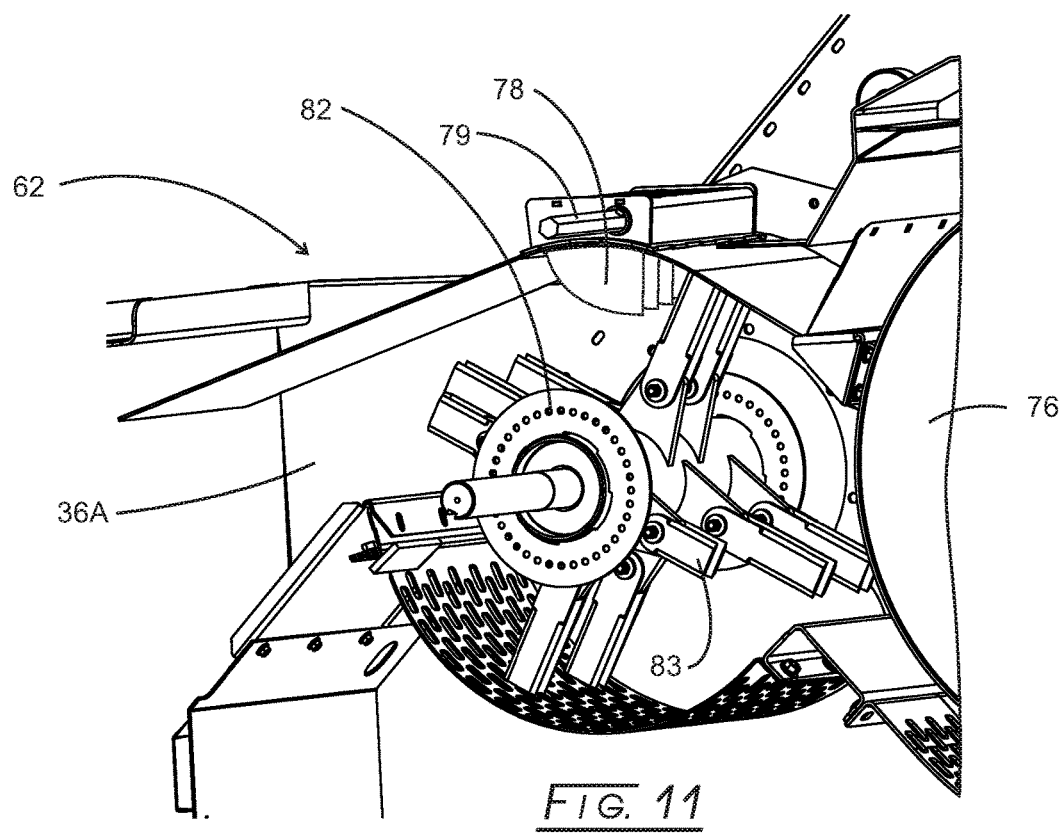
FIG. 11 is an isometric enlarged view of one of the straw chopper assemblies.
Figure 12:
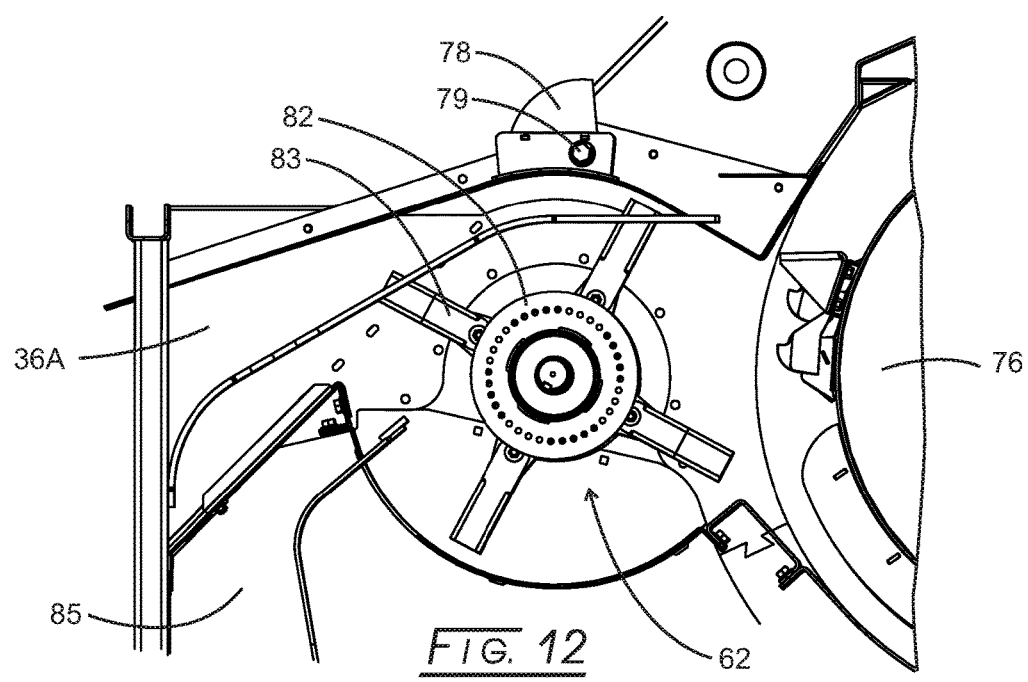
FIG. 12 is an enlarged rear view of one of the straw chopper assemblies.
Figure 13:
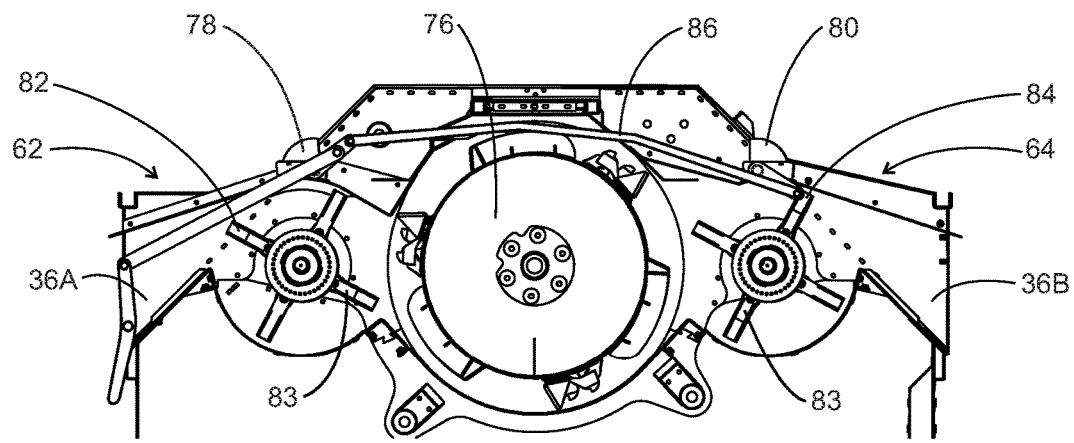
FIG. 13 is an enlarged rear view of the straw chopper assemblies showing the fixed blade adjustment bar with the fixed blades being in a home or disengaged position.
Figure 14:
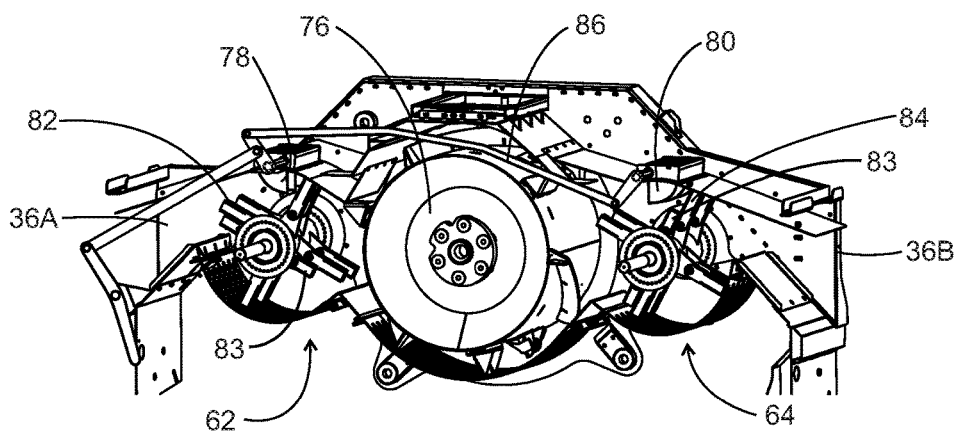
FIG. 14 is an enlarged rear view of the straw chopper assemblies showing the fixed blade adjustment bar with the fixed blades being in an operating or engaged position.
Figure 15:
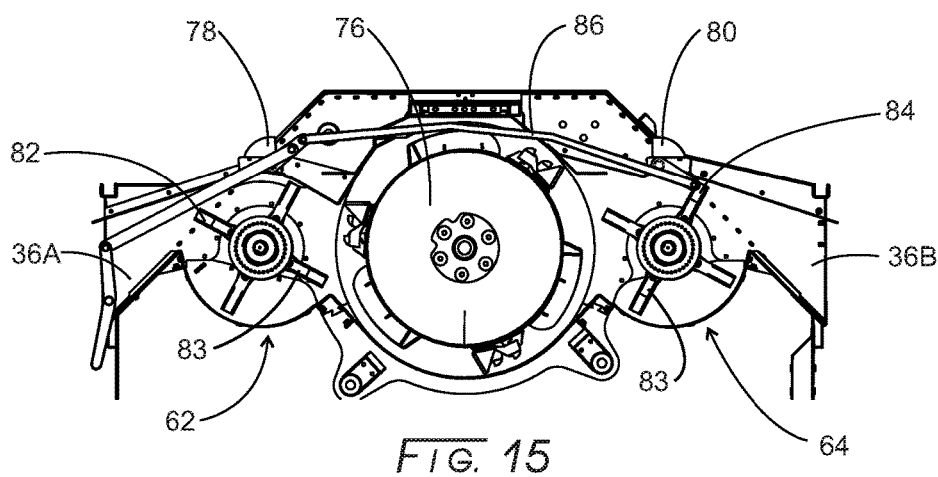
FIG. 15 is a view like that of FIG. 13.

Referring additionally to FIGS. 11 and 12, rotating knife assemblies, 82 and 84, rotate within straw chopper assemblies, 62 and 64, respectively, and rotate fully, partially, or not at all within stationary knives 78 and 80, respectively, which knives are movable, preferably, remotely movable by the combine operator, depending upon the type of crop being harvested. Each gang of stationary knives 78 and 80 are captured by a shaft (e.g., a shaft, 79, for stationary knives 78) rotatable to adjust how much of the stationary knives extends into and between the rotating knife assemblies, such as is seen in FIG. 11 in which the stationary knives 78 extend inwardly and in FIG. 12 where they are withdrawn.

These choppers are each rotated such they travel outwardly at their top, propelling the material along housing(s) located above each rotating drum at a distance to be clear of the spinning knives. The top sheets are shaped to induce movement of the material into the upper parts of the chamber, and then are peripherally parallel to the swung tip circle of the blades for the distance where possible, and then extend outwardly and downwardly toward the outside of the separator. Within the length of the top wrapper that is peripherally parallel to the blade tips will be located slots that will be used to extend "fixed knives" into the chopper swung circle in such a manner as to interrupt the flow of material to allow shearing of the crop material with moving knives interlaced with these stationary knives. Unique to this design within the industry is the configuration of these fixed knives that are coupled to a rotating hex shaft that will cause the knives to be rotated more inward or outward of the knife circle, such as to alter the severity of the chopping action.

Again unique to the industry, these knives will have a partial circle shape (quarter round) such that they are always filling the slot that they are rotating within. This is to help ensure that the slots are plugged sufficiently to discourage chopped material flow outwardly through these slots. Also, on the outward side of the top sheet, will be another channel shaped structure such that the knives pass through another slot. This cavity between the top sheet and the channel web will be filled with a suitable, flexible material that shall seal against the knife to further prevent egress of chopped material. Or the knives assembly can be completely removed and the top cover slots covered with a suitable cover plate to prevent material egress through the slots. The quarter circle shape of stationary knives 78 and 80 is advantageous compared to the typical rectangular shape knives in that the quarter circle or quarter round stationary knives constantly fill the slow in which the knives slide during rotation of the rotating knives. This construction in concert with the double wall structure that guides these knives prevents chopped straw from exiting the chopper housing into the atmosphere surrounding such sensitive items as engine cooling radiators, exhaust systems, etc., that cannot tolerate bombardment of chopped material.

To control the movement of fixed knife assemblies 78 and 80, handles will be attached to each of the hex pivot shafts that are the rockshaft for the engaging of the knives. Moving the handle in one circular direction or the other will determine the amount of knife engagement into the cutting circle. Noted here is that the circular direction of travel is opposite one versus the other for a similar change of knife position. Secondarily, a mechanical connecting bar, 86, between the two rockshafts can tie the two motions together for simultaneous synchronous adjust of both sides.

Additionally, since the travel of that control rod is largely linear, it is compatible with attachment to a linear actuator, 81, that could make moving the fixed knives in and out of the circle of the rotating knives. This would be especially handy for a customer who routinely changes from harvesting corn which requires the fixed knives to be retracted to save the structure from cob damage, to harvesting soybeans which are preferred to have the fixed knives inserted to cause shorter chopping of the troublesome soybean stalk material. The choice to move knives in and out of the chopping chamber could thus be programmed such that it would be an automatic function of a harvester that knew if it was in corn or soybeans, a choice known to the machine due to a change of gathering header between the two crops—oft times within the same day of operation. It is noteworthy that usually the rotational speed of the chopper rotor is run much faster in straw and stem crops such as soybeans and cereals, while a much slow rotation is used for corn harvest largely due to excessive mechanical damage if corn cobs are accelerated by fast spinning chopper knives. However, fully retracting the knives will net the desired reduced damage to the straw, as expected, while still plugging the slots against material egress.

Figure 16:
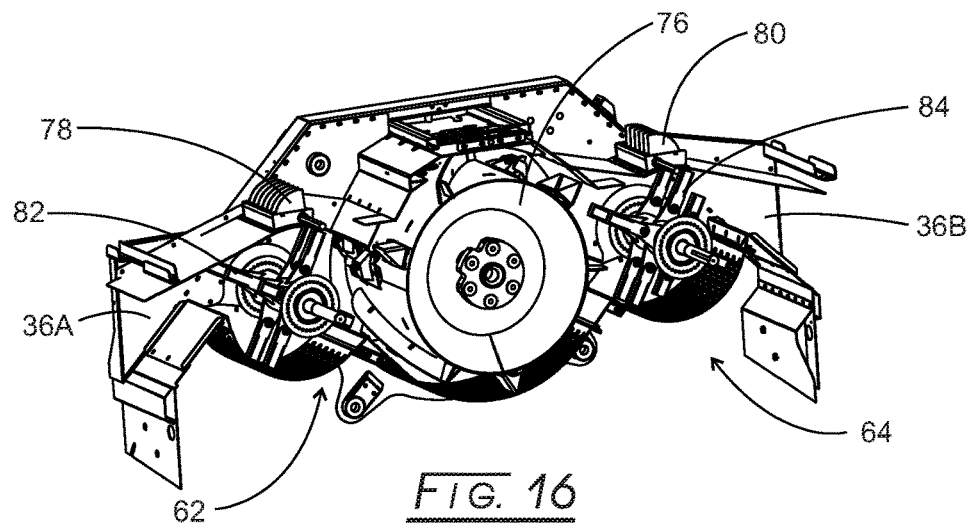
FIG. 16 is an isometric view of the straw choppers with the bottom curvilinear bottom in a normal position.
Figure 17:
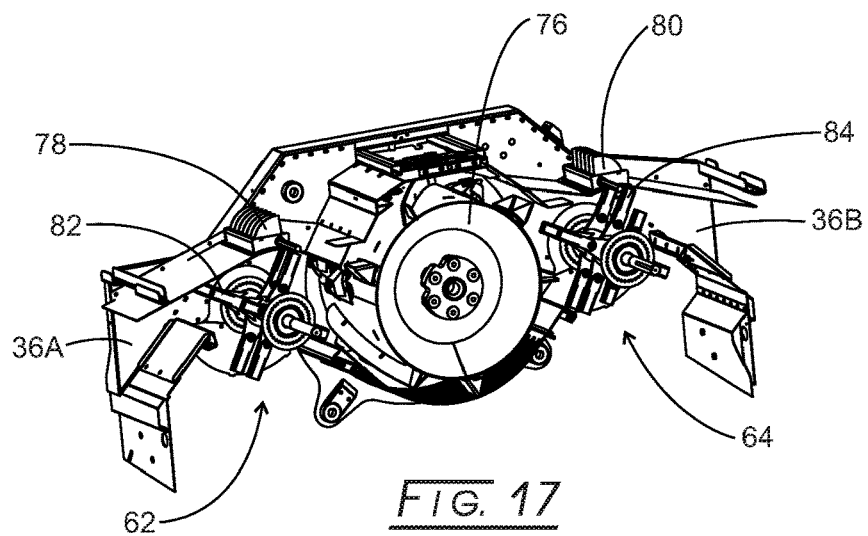
FIG. 17 is an isometric view of the straw choppers with the bottom curvilinear bottom removed.

There is another interesting operational nuance afforded by the overall layout of the choppers being beside the rotor and thereby also directly above the rearmost section of the sieves. When one removes the curved pan that defines the bottom (perhaps ½ or less) portion of the chopper wrapper (see FIGS. 16 and 17), the rotating knives of the chopper will create a low pressure suction to lift air upward into the chopper, effectively rendering the chopper and remaining wrapper configuration to be a type of cross-flow fan. This feeding of air into the chopper also will be driven by the pressure of the cleaning air inside the separator chamber being greater than the pressure inside the spinning chopper, and subsequently the air outside the chamber.

The net of this is to cause a very beneficial flow of high velocity, chaff laden air from inside the separator cavity, up into the choppers, and then out the chopper discharge, entraining the chaff into the chopped straw flow. It also will be quite beneficial to reduce the volume of chaff entrained in the air flowing out the back of the machine toward the rear module grain tank and the related articulation hitch members. Additionally, a big factor in the ability of the cleaning system to retain grain on the sieves versus blowing it off the back with excess horizontal rearward velocity, is the open area through which a given volume of air must exit the chamber. By purging a given volume of air out through the choppers, the air volume flowing off the end of the sieves will be reduced; thus, the horizontal velocity of same. The upward movement of air into the choppers is not fast enough to carry the grain with the airflow (terminal velocity of a physical object) whereas the much lighter (less dense) chaff can easily be floated upward in the air stream; thus, allowing chaff to be pulled out of the system while requiring that the heavier grain fall down onto the sieves where it will be captured.

Finally, to finish the system at the ends of the upper sheets of the chopper discharge, hinged hoods 38A and 38B with special configuration to better distribute the chopped material out over the ground. These hood hinges at their tops by rotatably connecting to the outer trim panel at the top of a mostly square hole cut out of the side styling panels, and thus the top (also is the outer) surface of the hood (or chute) is also finished for glamor purposes when closed fully. The under surface of the hood is shaped with a variable bend at its outer most edge such as to influence the flight of material that exits the chopper based upon what location fore and aft on the hood the material is being engaged. The shape is such that material exiting the front portion of the hood will be directed nearly straight outward at the major angle of the hood, and as one moves rearward on the hood the material is deflected more and more downward by the curve of the lower surface. Obviously the intent is to allow some of the material to fly far out from the side of the machine, and then gradually redirect the flow with increasingly more curve on the piece to cause the pattern to spread out over the swath width. This design embodies the developing theme of "throw directly to the furthest distance while deflecting to the lessor distances", the direct opposite of the function of typical rear mounted chopper hoods as explained previously.

Figure 18:
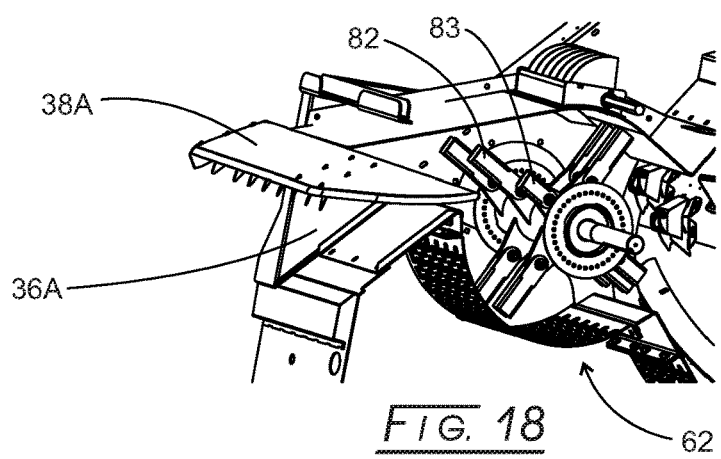
FIG. 18 is a enlarged isometric view of one of the choppers outlet and distribution hood.
Figure 19:
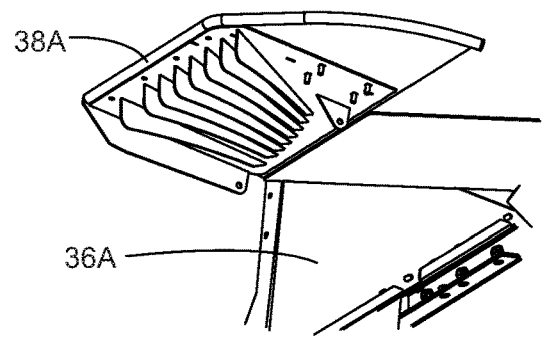
FIG. 19 is an exploded view of the outlet and distribution hood of FIG. 18.
Figure 20:
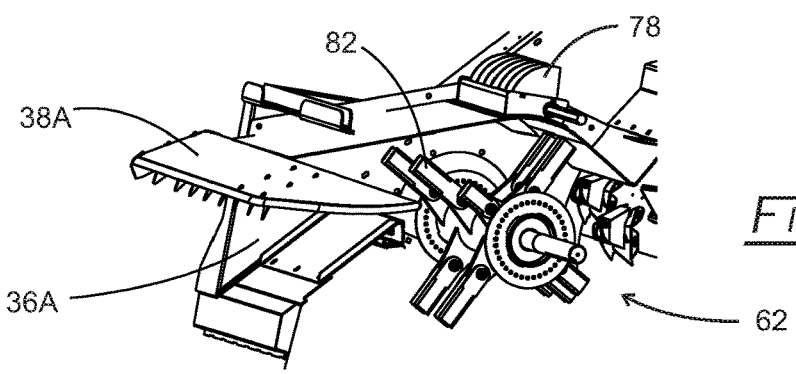
FIG. 20 is an enlarged view of the straw choppers assembly and outlet/hood assembly.
Figure 21:
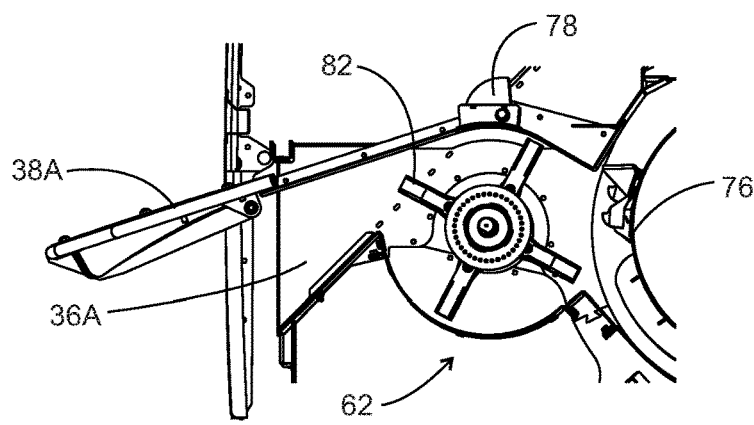
FIG. 21 is an enlarged view of one of the straw choppers assembly and outlet/hood assembly in an open and operating state.
Figure 22:
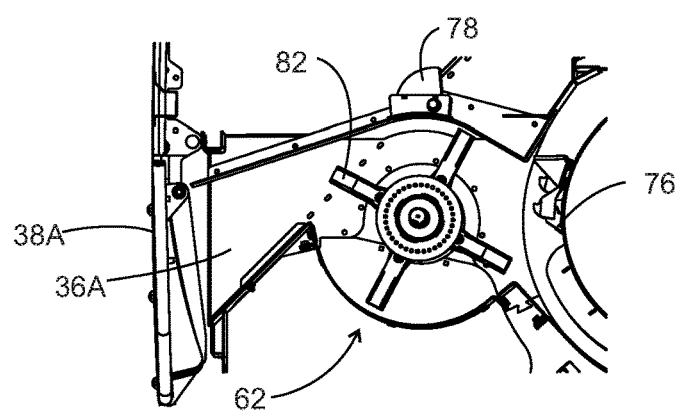
FIG. 22 is an enlarged view of one of the straw choppers assembly and outlet/hood assembly in a closed state.

It, then, is obvious that the ultimate width of the spread can be controlled by changing the major angle of the overall hood as it interrupts the crop flow, but still always splaying out the discharge to reach differing relative distances as desired for uniform distribution. Equally as obvious is that the angle of these hoods can be controlled by powered and controlled actuator to allow rapid remote changing of the angle to control spread width characteristics. Such hoods often are called a chopper tail board and have fins (see especially FIG. 18) on their underside to splay the material into a pattern.

The choppers will have a secondary exit chute that will serve to direct the rearmost of the threshing rotor discharge material onto two (one each side) swaths that will tend to cover the area of the full combine swath that is significantly behind the actual width of the harvester and tires. The rearmost rows (say, for example, 3 or 4) of knives on the chopper will have shorter knives and, thus, a smaller swung radius than the knives throwing material out the main chopper chute on the side of the chassis. See FIG. 18, for example, which shows the shorter row of blades, 83. This solves space issues within the chassis, but also has the advantage of ejecting material out rear chutes, 85 and 87 (see FIG. 10) at a slower speed than the main chutes, which is useful given that the material is effectively only falling downward and minimally outward. This lower velocity and less associated air movement will allow calmer conditions at the rear of the front module.

While the assemblies, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:

1. Straw chopper assemblies for a harvesting combine having a rotor and cage threshing assembly, which comprises:
   (a) straw chopper assemblies located on each side of the rotor discharge, the straw chopper assemblies accept straw material exiting the rotor, each straw chopper assembly comprising:
      (i) a curvilinear cage having an interior opening that accepts the rotor discharged straw material, and an opening that distributes chopped straw material to outside of the harvesting combine;
      (ii) a rotating assembly of knives housed within the curvilinear cage having slots between adjacent rotating knives;
      (iii) a shaft captured stationary assembly of knives movable for the rotating knives to pass fully, partially, or not at all between adjacent pairs of stationary knives, the stationary knife assembly comprising partial circular shaped knives such that the partial circular shaped knives fill the rotating knife assembly slots that the stationary knives are movable within to contain the rotor discharged straw material within the straw chopper assembly;
   (b) outlets in chopped straw material communication with the curvilinear cage opening through which the chopped straw material is discharged onto the ground adjacent to a side of the harvesting combine; and
   (c) hoods located over each of the outlets that direct the discharged chopped straw material onto the ground.

2. The straw chopper assemblies of claim 1, wherein a linear actuator is attached to the stationary knives for movement of the stationary knives.

3. The straw chopper assemblies of claim 1, wherein the rear blades on the rotating knife assembly are shorter than the forward blades to permit chopped material to exit from the rear of the harvesting combine.

4. The straw chopper assemblies of claim 3, wherein chutes direct the chopped material from the shorter blades to outside the rear of the harvesting combine.

5. The straw chopper assemblies of claim 1, wherein each rotating blade is formed from a pair of closely spaced-apart blades between which the stationary blades fit.

6. The straw chopper assemblies of claim 1, wherein the partial circular shaped stationary knives are in a quarter round shape and are held by a common rotatable shaft for adjusting the position of the stationary knives by rotation of the rotatable shaft.

* * * * *